Figure 1:
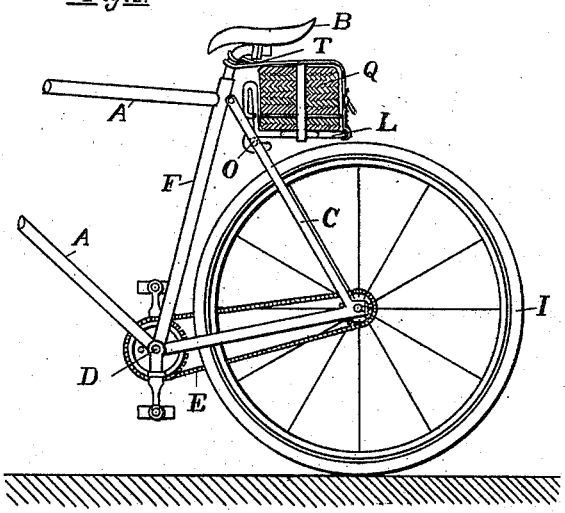

(No Model.)

E. C. BARTLETT.
BICYCLE PANNIER.

No. 584,662. Patented June 15, 1897.

Witnesses
K. Lockwood-Nevins.
W. P. Grover

Inventor
Edward C. Bartlett
By his Attorney
J. Richards

UNITED STATES PATENT OFFICE.

EDWARD C. BARTLETT, OF SAN FRANCISCO, CALIFORNIA.

BICYCLE-PANNIER.

SPECIFICATION forming part of Letters Patent No. 584,662, dated June 15, 1897.

Application filed May 29, 1896. Serial No. 593,606. (No model.)

*To all whom it may concern:*

Be it known that I, EDWARD C. BARTLETT, a citizen of the United States, residing in the city and county of San Francisco, State of California, have invented certain new and useful Improvements in Bicycle-Panniers; and I hereby declare the following specification and the drawings therewith to be a complete description of my invention with the method of constructing and applying the same.

My invention relates to a device, hereinafter called a "pannier," for fastening and holding packages to be carried on bicycles.

My improvement consists in a frame or main member, made, preferably, from a continuous metal rod or piece of wire, provided with hooks for attachment to the bicycle-frame and with straps to hold packages and also to support in part the pannier, the whole constructed and arranged to be mounted beneath and behind the seat of the rider, so as to be out of the way and protected by his person, centrally balanced on the vehicle, and not partake of the movements of guiding or directing or of vertical motions of either the forward or rear wheels of the bicycle.

My invention also includes a peculiar method of constructing such panniers, attaching them to the bicycles, and in covering them to prevent abrasion, as set forth and illustrated in the drawings herewith; and its objects are to provide a bicycle-pannier that can be instantly placed on or removed from or exchanged from one bicycle to another and wherein the main fastening is made by means of straps which not only hold packages on the pannier, but at the same time fasten the pannier to the saddle-post of the bicycle, so that both the package and pannier are loosened by one operation.

Figure 2:
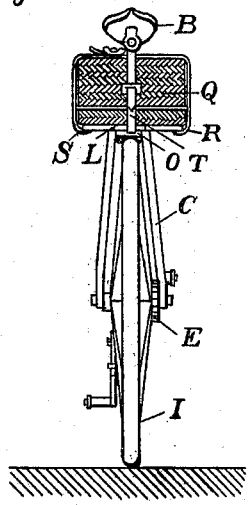
Figure 3:
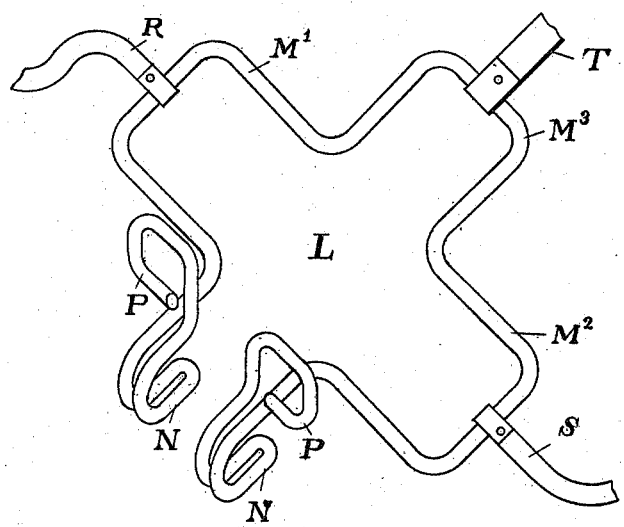

Figure 1 is a partial side view of a bicycle provided with my improvements. Fig. 2 is a rear end view of Fig. 1. Fig. 3 is a perspective view of the pannier detached from the bicycle.

In the description similar letters of reference are employed to designate like parts in the different figures of the drawings.

The main frame A of the bicycle is of the usual construction, the rear wheel I being mounted in the forked member C. D is the treadle axis; E, the driving-chain; F, the saddle-post; B, the saddle, and Q a package mounted on the pannier.

The pannier-frame L, I make of wire, preferably of a round section, covered with gutta-percha or any suitable material all over or only in such parts as come in contact with the bicycle-frame to prevent chafing or abrasion. Other portions of the wire can be covered with like material, or if the frame is not thus covered it can be coated or plated with non-corrosive metal, a gum fibrous covering all over being, however, preferable. This frame L can be made from a single piece of wire bent to form the eyes or strap-lugs $M'$, $M^2$, and $M^3$ and main support, as seen in Fig. 3; also, to form the attaching-hooks N, that engage the cross-strut O in the wheel-fork C, and the front guards P, that prevent the package Q from swiveling on its seat; also, to resist the forward pressure caused by the strap T, as will be hereinafter explained.

To hold the package Q laterally, I provide straps R and S, attached to the eyes $M'$ $M^2$ and buckled across the top of the package Q, as seen in Fig. 1. At the rear I provide a strap T, made long enough to pass over the top of the package Q and be lapped around the saddle-post F, as shown in Figs. 1 and 2, and then buckled back to the pannier-frame, so as to sustain the rear side thereof and press the package Q forward against the guards P. This strap T thus performs two separate purposes—it sustains the rear side of the pannier at different heights or angles as the dimensions of the package may require, and also holds the packages securely in a longitudinal direction clear of the rear-wheel guard, so the pannier and package thereon will not partake directly of the vertical movements of the rear wheel.

It will be observed that the pannier is pendent at its rear and not attached to any portion of the bicycle and that it can be instantly applied or removed by means of the open hooks N.

It is obvious that the shape of the pannier can be varied from the form shown in various respects, as taste or adaptation to particular kinds of packages may demand. I have shown it in its common and most simple form, adapted for miscellaneous loads and to bicycles of the usual construction.

The main objects of my invention as distinguished from other devices for carrying baggage or packages on bicycles are to place the load beneath and out of a rider's way, where it will be protected by his person and not partake of the guiding movements of the vehicle or the vertical movements directly of either the front or rear wheels; also, to provide secure attachment and easy removal of packages so mounted and at the same time of the pannier itself.

Having thus explained the nature and objects of my invention, what I claim as new, and desire to secure by Letters Patent, is—

1. In a bicycle-pannier, an open metallic frame adapted to be fastened by attaching-hooks to the rear-wheel fork of a bicycle and by means of a strap or straps passing around the package and the saddle-post so as to have the rear end of the pannier disconnected from the bicycle and free from vertical and lateral movement, substantially as described.

2. In a bicycle-pannier a metallic frame adapted to be fastened beneath and behind the rider's seat by means of open or attaching hooks to the rear-wheel fork and adjustable at the rear by means of a strap passing around the saddle-post and a package on the pannier so that the rear end of the pannier is disconnected from the bicycle, substantially as described.

3. A bicycle-pannier comprising in its construction a metallic frame formed of wire and bent to form a rear loop, vertical loops for the package to rest against, attaching-hooks, and side loops intermediate the front and rear ends of the frame, straps attached to the rear and side loops for securing a package in position on the pannier longitudinally and transversely, substantially as described.

4. In a bicycle-pannier a main frame having open or attaching hooks at one side, side straps to fasten packages transversely, and a longitudinal strap securing the packages carried and passing around the saddle-post, the rear end of the pannier being free from the bicycle, substantially as described.

In testimony whereof I have hereunto affixed my signature in the presence of two witnesses.

EDWARD C. BARTLETT.

Witnesses:
JAMES L. KING,
W. T. GROVER.